United States Patent [19]

Janoski

[11] 3,921,071
[45] Nov. 18, 1975

[54] HAZARD ASSESSMENT PROBE CIRCUIT

[75] Inventor: Florian B. Janoski, Allentown, Pa.

[73] Assignee: Atlas Powder Company, Wilmington, Del.

[22] Filed: Aug. 30, 1974

[21] Appl. No.: 501,890

[52] U.S. Cl. .............. 324/158 R; 324/95; 324/106; 325/67
[51] Int. Cl.² .................... G01R 5/22; G01R 21/04
[58] Field of Search .................. 324/158 R, 106, 95; 325/67; 343/703

[56] References Cited
UNITED STATES PATENTS

| | | | |
|---|---|---|---|
| 3,440,536 | 4/1969 | Ronci | 324/106 |
| 3,575,657 | 4/1971 | Dubrowsky et al. | 324/106 |
| 3,597,685 | 8/1971 | Ford | 324/106 |

*Primary Examiner*—John Kominski
*Assistant Examiner*—Ernest F. Karlsen
*Attorney, Agent, or Firm*—Connolly and Hutz

[57] ABSTRACT

A hazard assessment probe circuit for use at proposed blasting sites for determining the electrical current which would flow in any given electric blasting cap circuit due to the presence of extraneous electrical energy. With such a determination one can, with a high degree of certainty, conclude whether or not electric blasting operations at a proposed site can be conducted without risk of accidental detonation of the blasting cap, and any primary explosives adjoining the cap, as a result of pickup of extraneous electrical energy by the blasting circuit wiring. The device includes a powered circuit and means for varying the resistance in the circuit to balance the circuit. Representative blasting wiring is connected with a bridgewire in physical contact with a temperature responsive element in the circuit whereby an imbalance is created in the circuit when extraneous electrical energy is picked up by the representative blasting circuit wiring. The device also has means for indicating when the circuit is returned to its balanced condition when the resistance in the circuit is adjusted. An insulated heat sinking block houses selected components of the circuit as well as means for indicating the initial temperature of the temperature responsive element. Suitable tables are used to translate the amount of resistance adjustment into the effective heating current flowing in the bridgewire, and the rise in bridgewire temperature resulting from the pickup of extraneous electrical energy by the blasting circuit wiring.

14 Claims, 3 Drawing Figures

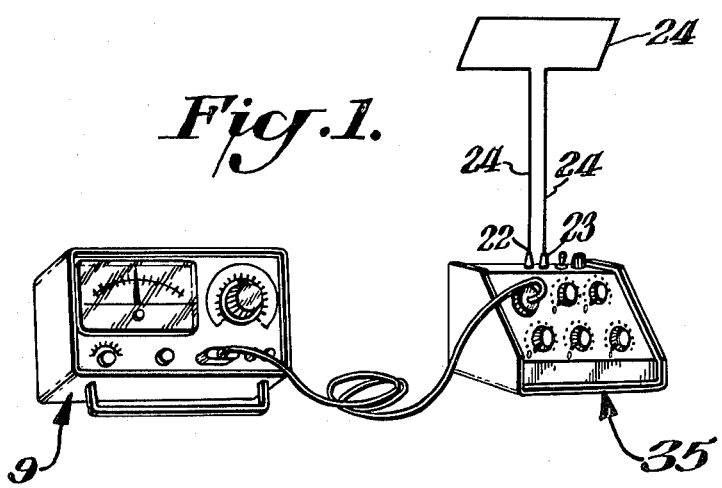
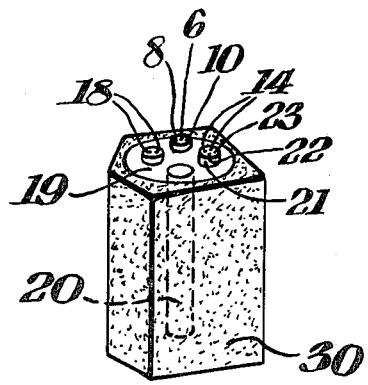
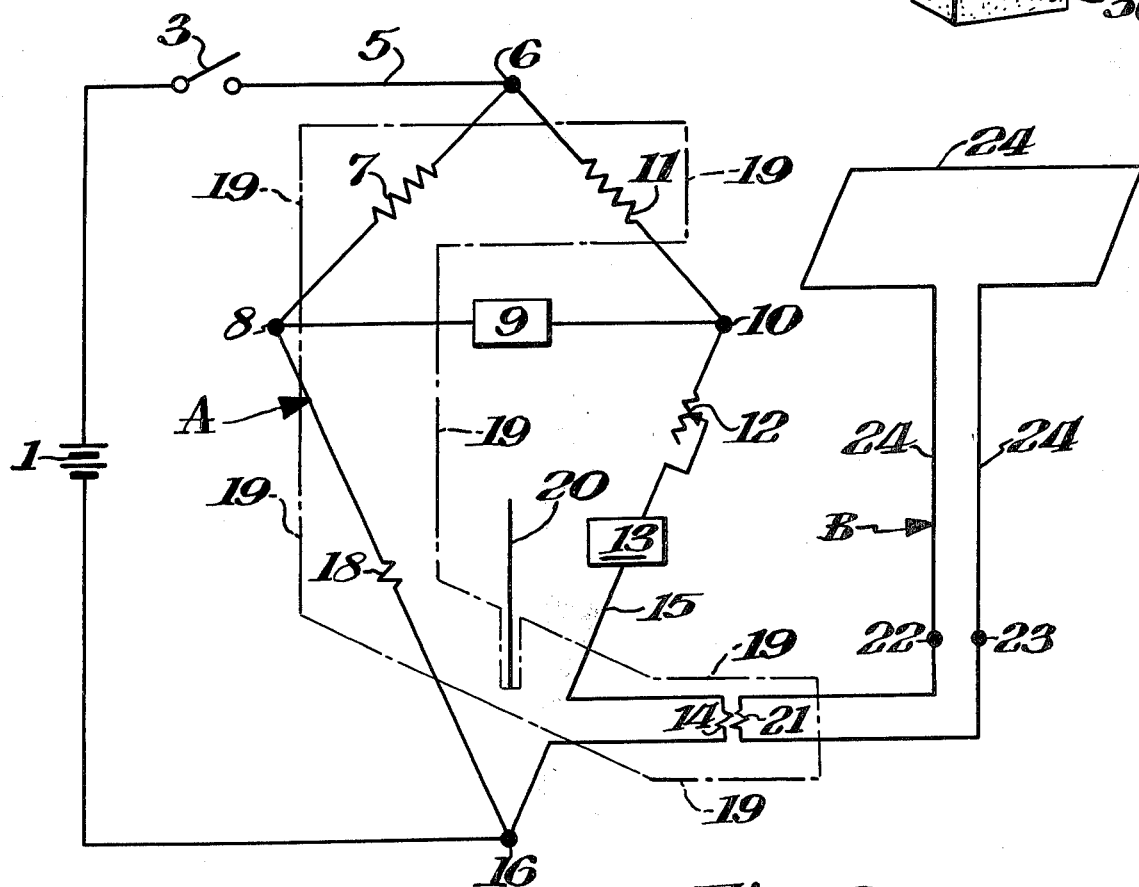
Fig.1.
Fig.3.
Fig.2.

HAZARD ASSESSMENT PROBE CIRCUIT

BACKGROUND OF THE INVENTION

Electric blasting caps have legwires attached so that they can be fired by direct and deliberate application of electrical energy to the closed blasting circuit containing the caps. However, electric blasting caps can conceiveably be accidentally initiated by the individual or combined effects of other unwanted sources of electrical energy such as stray current in the area, inductive or capacitive pickup from overhead power lines, spurious discharge of static electricity and radio frequency (RF) energy.

A potentially hazardous condition may exist when one or more of these sources is unusually strong and is present at a site where electric blasting operations are proposed. It becomes necessary to make an assessment of the potential hazard to determine whether or not electric blasting operations may be conducted safely in the area in question or whether electric blasting would be inadvisable. The assessment of any potential hazard from RF energy has heretofore been one of the most difficult to make since present methods imploy basically indirect and cumbersome systems of questionable accuracy and of even more questionable confidence.

The prior art and practice has attempted to solve this problem, however, the art fails to provide the reading stability, degree of sensitivity, and hence accuracy of the present invention. For instance, the Strickland U.S. Pat. Nos. 3,091,965 and 3,517,555 are limited to accounting for single frequency RF power and not the integrated effects of other simultaneous frequencies. The patents are also limited to accounting for radio frequency pickup alone and do not provide for the determination of the integrated effects of different kinds of electrical energy sources, i.e., radio frequency plus inductive pickup from high voltage power transmission lines. Among other inadequacies of these teachings is the fact that the temperature compensating elements and the measuring elements are geometrically remote from each other. The requirement that both measuring and temperature compensating elements function in the same ambient temperature environment for achieving accurate results is not provided for in the Strickland circuits. Also, true characteristics cannot be achieved by Strickland since he does not duplicate actual heat transfer characteristics in his initiators.

Probably the practice most widely used at the present time for determining whether or not it is safe to conduct electric blasting operations in the vicinity of a radio frequency transmission source involves the use of distance tables found in the Institute of Makers of Explosives, Safety Library Publication No. 20 entitled "Safety Guide For The Prevention Of Radio Frequency Radiation Hazards In The Use Of Electric Blasting Caps". These tables resulted from the establishment of hypothetical antenna models which could result in worse case antenna configurations offering the greatest effective antenna apertures for given ranges of frequencies, thereby providing for some maximum credible RF energy pickup. Generous safety factors were of necessity included in specifying minimum safe distances in order to allow for all known and possible unknown contingencies. In the IME publication 20, the distance tables were developed in an indirect manner. The measured or calculated field strength (or power density) at the blasting circuit location resulting from an RF transmission source a given distance away was then mathematically factored with a maximum credible effective aperture to yield a value for the RF power intercepted by the blasting circuit. All of this is a wholly indirect process containing a large element of uncertainty and, by necessity, employing a comfortable safety factor in the assumed value for the effective aperture. This in turn resulted in the establishment of minimum safe distances which can be prohibitively great. The safe distance as determined might very well rule out electric blasting for many projects for which electric blasting is ideally suited.

SUMMARY OF THE INVENTION

The hazard assessment probe circuit of the present invention includes a bridge circuit which is energized by an electrical source such as a battery. A null detector which has its own amplification and electrical power supply system such as a battery, is also connected with the circuit. Two fixed and matched resistors are connected into the circuit along with two matched thermistors, the resistance values of which vary with temperature but which remain closely similar in magnitude. There is also a variable resistance so placed within the circuit that it can be used to balance out the small difference in resistance between the measuring and the temperature compensating thermistors. In addition, there is a resistance box by which a variable resistance in the circuit can be adjusted from a value of zero through the highest value of resistance obtainable by one of the thermistors. An antenna, any simulated circuit or any other interceptor of extraneous electrical energy is attached to terminals of a separate circuit which includes a heating element in physical contact with the measuring thermistor of the aforesaid circuit. For taking the initial temperature of the measuring thermistor a thermometer or other temperature sensor is housed within an insulated heat-sinking, temperature stabilizing block. The matched and fixed bridge resistors are also housed in this block to achieve even finer system stability.

Electro-explosive devices (E.E.D.) may contain heating elements including hot wire elements, or bridgewires, the resistance of which may vary from a very low value to a very high value, exploding bridgewires, carbon bridges or other conducting mixes. The commercial electric blasting cap is one type of E.E.D. containing a bridgewire, the nominal resistance of which is about one ohm. Although illustrative examples herein are made in terms of commerelectric blasting caps, the hazard assessment probe circuit can be used to assess hazards to any type of E.E.D., with proper modifications, without departing from the teaching of this invention. The measuring and compensating thermistors are mounted in contact with the bridgewires of actual live electric matches, each of which is contained within a blasting cap, completely authentic except for a non-explosive base charge. The true heat transfer characteristics and the geometry of the internal system of the electric blasting cap are faithfully preserved.

Although the device accurately responds to the many types of electrical energy sources within an area to be tested, it has particular significance with respect to radio frequency power.

It is therefore an object of my invention to provide a device for making accurate hazard assessments which are free of the overly restrictive safety factors previously factored into such assessments. The device is also free of any attendant uncertainty and inaccuracy.

It should be pointed out that the probe circuit of the present invention is completely portable and can be carried in a suitcase or other container which can be easily handled by one man. The total weight is around 10 pounds while the prior units used to make broad band RF field survey measurements weigh as much as 200 pounds or more, take two men to handle and could require the volume of a steamer truck for transportation. Other objects and advantages of the invention will become apparent from a study of the following description and drawings wherein:

FIG. 1 is a pictorial view of the complete hazard assessment probe instrumentation.

FIG. 2 is a schematic view of the device showing the complete circuit used therewith.

FIG. 3 is a perspective of the insulated heat sink block which is contained inside a control instrument shown in FIG. 1.

DETAILS OF INVENTION

With reference to the drawings which illustrate the hazard assessment probe unit there is shown a battery 1 which supplies power through switch 3 to a bridge circuit A having poinnts 6, 8, 16 and 10 as well as components 7, 18, 14, 13, 12 and 11 tied into the circuit all housed within control instrument 35. A sensitive null detector 9 having its own amplification and battery power supply system is incorporated with the bridge circuit. Components 7 and 11 connected with the circuit A are fixed and matched resistors while components 18 and 14, also connected with the circuit, are matched thermistors. The resistance value of measuring thermistor 14, at any given ambient temperature is always equal to or less than that of temperature compensating thermistor 18. Component 12 is a variable resistance employed to make up for any difference in resistance between thermistors 14 and 18 and thereby to obtain an initial balance of bridge circuit arms between 8 and 16, as well as between 10 and 16. Unit 13 in the circuit is a resistance box wherein the resistance can be varied from zero through to and beyond the highest value of resistance obtainable by the single thermistor 14. Unit 13 can be used to perform the function of variable resistor 12 in addition to its own function in the measurement process and component 12 could be eliminated. However, the measurement process is made more convenient by retention of component 12 in addition to unit 13. Antenna 24 is shown connected to or attached to the terminals 22 and 23 of the antenna circuit B. Included in the antenna circuit is bridgewire 21 which wire supported in a hole extending downward within an insulated temperature stabilizing or heat sink block 19 lies in physical contact with thermistor 14 of circuit A and is also supported in a hole within the block. A thermometer 20 for indicating the initial temperature of the measuring thermistor 14 is also housed within a hole in the block 19 shown in dotted line outline in FIG. 3. Thermistors 14 and 18 as well as the fixed bridge resistors 7 and 11 are also contained within the block thus providing additional temperature stability to the system. The insulated metal heat sinking block provides a high degree of temperature stability and thereby adds to the reading stability and accuracy. The components housed within it are not subject to transient fluctuations in temperature. The block 19 is housed within control instrument 35.

The measuring and compensating thermistors 14 and 18 are mounted inside dummy blasting caps 14 and 18 (FIG. 3) which preserves the authenticity of geometry and composition of all internal and external components as closely as possible except for the nonexplosive base charge. An inert material is substituted for the normal detonable material. The authenticity of reproduction preserves the extraneous electricity source response characteristics insofar as possible of the measuring probe cap.

As for the physical contact between the bridgewire 21 and the measuring thermistor, an electric match with its bridgewire is used and the minute thermistor, which is of the bead type is mounted in the match head contacting the bridgewire but not cemented thereto. The match is then given the standard match dips which serves to encase and hold the thermistor in place against the bridgewire, and also to provide the true heat transfer characteristics of the bridgewire/pyrotechnic mix used in electric blasting caps.

This assembly is then inserted into an inert-loaded (base charge) dummy cap and plugged with a rubber plug so that what results is an authentic cap assembly.

The holes within the block 19 are then sealed with an inculating material after the components are inserted. The outside of the block 19 is then encased with a suitable insulation material 30.

The insulated block 19 also serves to dissipate and distribute any minute quantities of heat put into the measuring cap via the heated bridgewire 21 or heat which could conceiveably enter the cap by conduction via the wires of the antenna 24 so that the measurement system and the temperature sensor may range together to a uniform temperature.

The hazard assessment probe circuit operates as follows. Before the start of any measurement antenna 24 is not connected to terminals 22 and 23 and the resistance of component 13 is set at zero. The resistance 12 is then adjusted to obtain a zero or null indication from component 9 which compensates for the slight difference between the resistances of measuring probe thermistor 14 and temperature compensating probe thermistor 18. The temperature of the measuring thermistor 14 is read from temperature sensor 20 housed in block 19. The antenna, simulated blasting circuit or any other power intercepting wire configuration is then attached to terminals 22 and 23. Energy interception by antenna 24 gives rise to an electric current in the bridgewire 21 which raises its temperature. This temperature rise in the bridgewire 21 effects a prompt change in the resistance value of thermistor 14 which causes a difference in current flow between branch 6, 8, 16 of the circuit and branch 6, 10, 16 thereof. This imbalance results in a difference of potential between points 8 and 10 which in turn causes the indicator of component 9 to move from the null position. The resistance of the resistance box 13 is then increased until the null indication is reestablished in component 9.

The amount of resistance introduced by component 13 is equal to the decrease of resistance of thermistor 14. Here negative temperature coefficient of resistance thermistors are used. It should be pointed out that the circuit would be altered slightly for thermistors having positive temperature coefficients. The resistance introduced by component 13 is noted. The effective heating current flowing in the bridgewire 21 is then read from a curve for thermistor 14 at the indicated ambient temperature on a plot of Resistance Change (ΔR) vs. Current. The temperature of the bridgewire may also be read from another plot for thermistor 14 of Resistance vs. Temperature.

Other circuit configurations and components may be employed to secure the same results without departure from the intent of the invention. For example, every component of the system could be contained in a form of the aforementioned temperature stabilizing block 19 or a more sophisticated means for temperature stabilization might be devised. The instrumentation might be so modified as to give a direct readout of the effective heating current flowing in the bridgewire or the bridgewire temperature may be read out directly. Any of these as well as other devices might be introduced without departing from the general scope of the invention.

What is claimed is:

1. A hazard assessment probe circuit for measuring the effective current introduced into an electro-explosive device bridgewire by extraneous electricity, including but not limited to radio frequency energy, intercepted by external circuit wiring connected to the electro-explosive device comprising a bridge circuit, first and second branches in the bridge circuit, a self-contained power supply for said circuit, a null detector directly connected between the first and second branches to indicate the balance status of the bridge circuit, a fixed resistor in each of the bridge branches, said resistors being matched resistors, a compensating thermistor in the first branch that responds only to ambient temperature within the temperature stabilizing block, a measuring thermistor in the second branch of the bridge circuit responsive to heat generated by extraneous electrical energy, said thermistors being matched thermistors and subject to the same ambient temperature during operation wherein the resistance values thereof vary with temperature but which remain closely similar in magnitude for any given ambient temperature, a variable resistance element in the second branch of said bridge circuit for adjusting the resistance of said second branch to obtain initial balance of the bridge and to compensate for resistance change in the measuring thermistor and thereby rebalance the bridge, said variable resistance unit providing an indication of the resistance adjustment, a bridgewire that is in physical contact with said measuring thermistor whereby changes in bridgewire temperature are sensed by said measuring thermistor, an extraneous electricity intercepting circuit connected to said bridgewire such that any extraneous electrical energy intercepted will flow through the bridgewire causing an increase in its temperature, an insulated temperature stabilizing block for housing the matched thermistors and the fixed, matched resistors, and means housed within said block for indicating the temperature of the temperature stabilizing block.

2. The probe circuit of claim 1 wherein the self contained power supply is a battery.

3. The probe circuit of claim 1 wherein a null detector unit is connected with both branches of the circuit, said null unit having its own amplification and power supply means.

4. The probe circuit of claim 1 wherein the compensating thermistor is in contact with a bridgewire in a dummy electric blasting cap which has no external connections.

5. The probe circuit of claim 1 wherein the insulated temperature stabilizing block is a metal heat sinking block.

6. The probe circuit of claim 5 wherein holes are provided in the insulated block to accommodate the fixed, matched resistors and the measuring and temperature compensating thermistors, said thermistors being housed in dummy blasting caps, insulating means for sealing off the caps and fixed resistors within the holes, and insulating material to encase the block.

7. The probe circuit of claim 1 wherein the extraneous electrical energy intercepting means is an antenna.

8. The probe circuit of claim 1 wherein the extraneous electrical energy intercepting means is an actual electric blasting circuit.

9. The probe circuit of claim 1 wherein the bridgewire is contained within an electric match, and the measuring thermistor is mounted in contact with the bridgewire of the electric match and held in place by standard match dips.

10. The probe circuit of claim 1 wherein the measuring and compensating thermistors have a negative coefficient of resistance.

11. The probe circuit of claim 1 wherein the measuring and compensating thermistors have a positive coefficient of resistance.

12. The probe circuit of claim 1 wherein the electro-explosive device, the extraneous electrical energy hazard of which is to be assessed, is a commercial electric blasting cap with a non-detonable base charge.

13. A portable hazard assessment probe circuit for measuring in an area being considered for electrical blasting operations the effective current introduced into a bridgewire of a commercial electric blasting cap with a non-detonable charge by extraneous electricity in the area including stray currents, inductive and capacitive pickup from overhead power lines, static electricity and radio frequency (RF) energy, to determine whether the extraneous electricity present in the area is sufficient to accidentally detonate electric blasting caps normally used in said blasting operation, said probe device comprising a bridge circuit, first and second branches in the bridge circuit, a battery connected with the circuit for powering said circuit, a null detector having its own power supply means and amplification means, said null detector being directly connected between the first and second branches to indicate the balance status of the bridge circuit, a fixed resistor in each bridge branch which resistors are matched, a compensating thermistor in the first branch that responds only to ambient temperature within the insulated temperature stabilizing block, said thermistor being mounted inside a commercial blasting cap having a bridgewire and a non-detonable charge, said compensating thermistor being in contact with the blasting cap bridgewire, a measuring thermistor in the second branch of said bridge circuit which is responsive to heat generated by current from pickup of said extraneous electrical energy, said measuring thermistor being mounted inside a commercial blasting cap containing a non-detonable material, said thermistors being matched thermistors and having a negative coefficient of resistance, a variable resistance element in the second branch of said bridge circuit for adjusting the resistance of said branch to obtain initial balance of the bridge and to compensate for resistance change in the measuring thermistor and thereby rebalance the bridge, said variable resistance unit providing an indication of the rsistance adjustment, a bridgewire in physical contact with said measuring thermistor whereby changes in bridgewise temperature are sensed by said measuring thermistor, an antenna connected to said bridgewire whereby any extraneous electricity intercepted by the antenna will result in a current through the bridgewire causing an increae in the bridgewise temperature, an insulated metal heat sinking block having holes therein which house the fixed, matched resistors, th blasting caps containing the thermistors and a thermometer, insulating means for sealing off the holes and insulating material encasing the block.

14. The device of claim 13 wherein the thermistors have a positive coefficient of resistance.

* * * * *